US005898370A

United States Patent [19]

Reymond

[11] Patent Number: 5,898,370
[45] Date of Patent: Apr. 27, 1999

[54] SECURITY MONITORING SYSTEM AND METHOD

[75] Inventor: Jean-Jacques Reymond, Harleysville, Pa.

[73] Assignee: AT&T Corp., Middletown, N.J.

[21] Appl. No.: 08/991,733

[22] Filed: Dec. 16, 1997

[51] Int. Cl.$^6$ .............................. G08B 13/02; G08B 21/00
[52] U.S. Cl. ........................ 340/540; 340/539; 340/541; 340/572.1; 340/572.8
[58] Field of Search .................................. 340/572, 539, 340/540, 541, 572.1, 572.8

[56] References Cited

U.S. PATENT DOCUMENTS

| | | | |
|---|---|---|---|
| 5,237,307 | 8/1993 | Gritton | 340/572 |
| 5,406,263 | 4/1995 | Tuttle | 340/541 |
| 5,512,738 | 4/1996 | Yuen | 340/541 |
| 5,528,222 | 6/1996 | Moskowitz et al. | 340/572 |
| 5,656,996 | 8/1997 | Houser | 340/541 |
| 5,682,143 | 10/1997 | Brady et al. | 340/572 |
| 5,831,531 | 11/1998 | Tuttle | 340/540 |

OTHER PUBLICATIONS

"Integrated Circuit Cards, Tags and Tokens, New Technology and Applications", Chapter 4, pp. 39–64, edited by P. L. Hawkes, D. W. Davies, and W. L. Price, BSP Professional Books, Oxford, England.

Gemplus, Annual Report, 1996, pp. 7–8.

Gemplus, advertising leaflet entitled "Gemplus Services and Products, Global Offer", Feb., 1997.

Internet web site page "Gemplus Radio Tag: A New Technology to Fight . . . ", http://www.gemplus.fr/presse/counterfeit_–uk.htm, printed Aug. 6, 1997.

*Primary Examiner*—Glen Swann
*Attorney, Agent, or Firm*—Barry Freeman

[57] ABSTRACT

An arrangement for monitoring the security status of an object includes affixing to the object a passive two way communication circuit such as a frangible radio security tag or smart label. The tag or label, when operational, is arranged to receive a remotely generated request for status information and, responsive to the request, to transmit status information to a remote device. The radio tag or label is affixed to the object in a manner so that it is rendered inoperative if the object is tampered with. By remotely monitoring the status information on a periodic basis, the security of the object can thus be determined. The tag can include a circuit built on a substrate that is scored or otherwise rendered breakable along a predetermined axis or in a predetermined direction. This assures that when the object to which the radio tag is affixed is subject to authorized manipulation or tampering, critical components in the tag will in fact break. If desired, the radio tag can be incorporated into a label or other covering to make the radio tag inconspicuous.

13 Claims, 6 Drawing Sheets

SECURITY MONITORING SYSTEM AND METHOD

FIELD OF THE INVENTION

This invention relates generally to a security monitoring system and method, and, more particularly, to such as system and method using a frangible radio tag or smart label that, when operational, can be remotely queried by radio signals. The radio tag or smart label is affixed to or positioned on a device to be monitored, for example, a sealed container, in such a way that the tag or label is rendered inoperative when the device has been tampered with.

BACKGROUND OF THE INVENTION

Various monitoring techniques have been used to remotely monitor the security status of an object. For example, a closed circuit television system can be set up to monitor an area in which the object is located. The television output may be monitored manually or by computer to detect unauthorized activity or changes in the television picture, indicating intrusion or movement of the object. However, these systems are expensive, in that a separate camera and/or receiver may be needed for each object or area that is kept under surveillance.

Alternatively, an object (such as a door or window) can be wired to a control panel or a central station in such a way that a signal is generated when the window or door position is changed. Such wiring is often expensive, and it is difficult to relocate the object without rewiring the security system. If a wireless communication system is used, the transmitter that monitors the door or window is typically expensive, due in part to the fact that a power source must be included to operate the transmitter, and due in part to the complexities of the transmitter itself.

U.S. Pat. No. 5,528,222 issued to Moskowitz et. al on Jun. 18, 1996 discloses a radio frequency circuit and memory in a thin flexible package. This type of device is sometimes referred to as a "radio tag". Moskowitz mentions that the radio tag device includes a semiconductor circuit with logic, memory, and so on. He contemplates using the radio tag in conjunction with credit cards, passports, admission tickets and stamps, but does not show or suggest any arrangement which would disable the radio tag as a result of tampering, allowing that device to be used for remote monitoring of the status of objects to which the device is attached.

In its annual report for 1996, Gemplus, a French-based company, describes its Series 200 RF-ID tag, which is a small radio tag device that can be passively read from a remote location. In this report, mention is made of "security schemes", but Gemplus makes no reference to any use of its RF-ID tags in the manner that would provide the desired functionality as is discussed above.

SUMMARY

In accordance with the present invention, an arrangement for monitoring the security status of an object includes affixing to the object a passive two way communication circuit such as a frangible radio security tag or smart label. The tag or label, when operational, is arranged to receive a remotely generated request for status information and, responsive to the request, to transmit status information to a remote device. The tamperproof radio tag or label is affixed to the object in a manner so that it is rendered inoperative if the object is tampered with. By remotely monitoring the status information on a periodic basis, the security of the object can thus be determined.

In accordance with one embodiment of the present invention, the radio tag or label is an RF-ID (radio frequency-identification) radio tag that contains information that can be interactively read and/or modified at a distance. The technology used in constructing a radio tag in accordance with the present invention can be similar to that shown in U.S. Pat. No. 5,528,222 issued to Moskowitz et. al, discussed above, or alternatively, can be similar to that available from Gemplus. The radio tag is positioned on an object or article so that the radio tag is disabled when the object or article has been subject to tampering.

In accordance with one aspect of the invention, the radio tag includes a circuit built on a substrate that is scored or otherwise rendered breakable along a predetermined axis or in a predetermined direction. This assures that when the object to which the radio tag is affixed is subject to unauthorized manipulation or tampering, one or more critical components in the tag will in fact break, assuring that the tag itself will become inoperative.

In accordance with another aspect of the invention, the radio tag can be incorporated into a label or other covering to make the radio tag inconspicuous. In this way, the tag can perform its intended security monitoring and tamper-inhibiting functions, but a person that might tamper with the object on which the tag is affixed would not be aware that the tag is in place.

BRIEF DESCRIPTION OF THE DRAWINGS

The present invention will be more fully understood by reading the following detailed description in conjunction with the drawing, in which.

DETAILED DESCRIPTION

Figure 1:
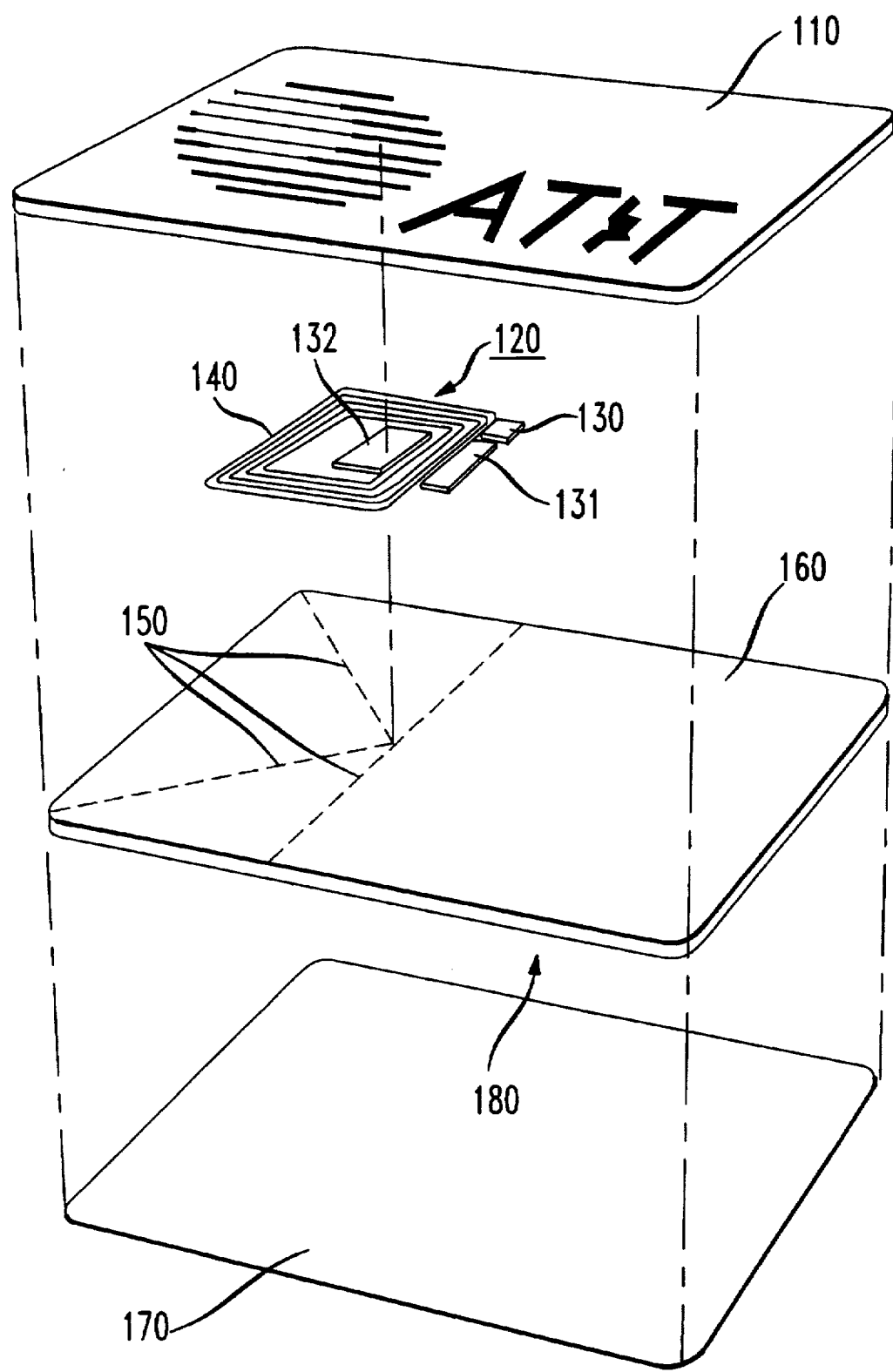
FIG. 1 is a diagram illustrating an arrangement for a radio tag in accordance with the present invention.

Referring first to FIG. 1, there is shown a radio tag device constructed in accordance with the present invention. The device is an assembly that consists of radio tag circuitry indicated generally at 120 that is positioned on and affixed to a substrate 160. Substrate 160 is, in turn, sandwiched between a soft opaque plastic layer 110 and a backing layer 170. Each portion of this composite construction will be discussed in turn.

As shown in FIG. 1, a typical arrangement for radio tag circuitry 120 includes an antenna 140, radio frequency circuits 130, logic and other control circuits 131, memory 132, etc. As contemplated by the present invention, radio tag circuitry 120 represents a passive device that needs no source of energy. Rather, it can be both read and written by a remotely generated radio signal. Different radio tags can be distinguished from each other in the read and/or write process, since each may have a unique identification code that can be read. Memory 132 can be used to store various information used in communicating with the radio tag. This information can include the date of the last reading or the last successful operation of the radio tag. The information that is transmitted to the radio tag can be stored in the memory and later can, upon a subsequent query, be read out of memory 132 and transmitted to a remote monitoring device or location. As stated previously, the specific arrangement of radio tag circuitry 120 can vary, as long as the functionality described in U.S. Pat. No. 5,528,222 issued to Moskowitz et. al. or in the Gemplus report, both of which are discussed above, is achieved.

Substrate 160 can be made of a layer of thin, rigid material such as a ceramic material, that is breakable when flexed or bent. Radio tag circuitry 120 is affixed to the surface of substrate 160, such as by epoxy or other adhesive, so that removal or tampering is difficult or impossible. The individual positions of the different elements of circuitry 120 on substrate 160 may, of course, vary with each radio tag design, so that the arrangement shown in FIG. 1 will only serve as an example. To control the breakage of substrate 160, cuts or indentations 150 are formed along the surface of substrate 160 (such as by a scoring or etching process) in such a way that the cuts extend into the region over which radio tag circuitry 120 is affixed. In this manner, when substrate 160 is flexed, cracks or breaks will occur along cuts 150, causing portions of radio tag circuitry 120 to be broken. These portions of the radio tag circuitry are advantageously critical components, meaning that they are components needed if the radio tag is to operate by responding to remotely generated query messages. Following the breakage, the operation of the radio tag is thereby prevented.

Soft opaque plastic layer 110 can be a plastic film or heavy paper layer that is printable. The purpose of this layer is to conceal the inner components of the assembly of FIG. 1, and to identify the source of the device, its model number or other data, if desired.

The purpose of backing layer 170, which may be plastic or paper, is to temporarily cover and protect a layer of adhesive that is applied to the bottom layer of substrate 160. When it is desired to use the assembly of FIG. 1 (as for example, as shown in FIGS. 2 and 3 below) to prevent tampering, layer 170 is removed, the adhesive layer is exposed, and the assembly is securely affixed to the object or device to be monitored in such a manner as subsequent removal would interfere with the operation of radio tag circuitry 120.

Figure 2:
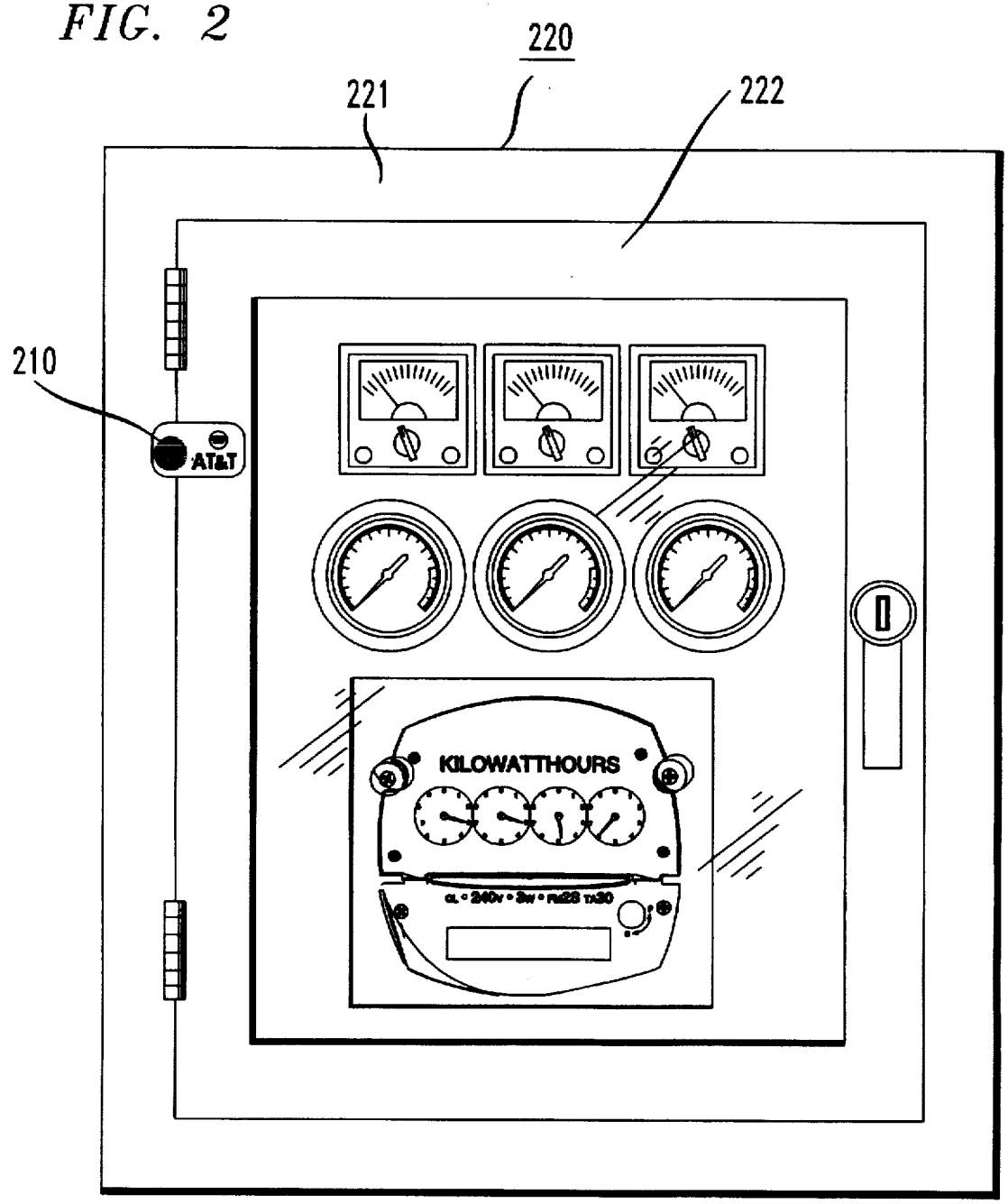
FIGS. 2 and 3 are diagrams illustrating the placement of a tag of the type shown in FIG. 1 on an electric meter to be monitored for possible tampering.
Figure 3:
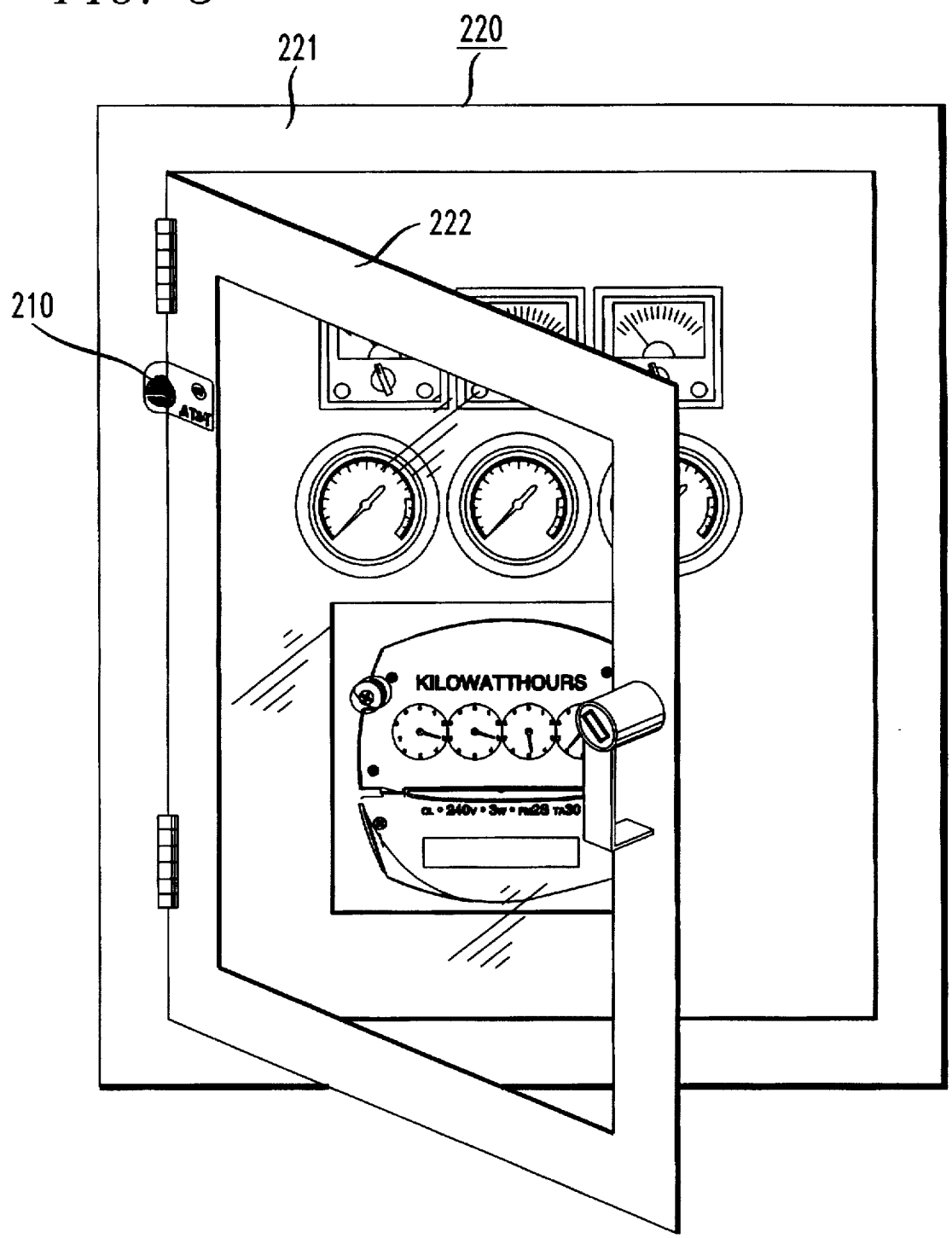

FIGS. 2 and 3 are diagrams illustrating the placement of a radio tag assembly 210 of the type shown in FIG. 1 on an electric meter 220 to be monitored for possible tampering. Note that the assembly 210 is affixed to and positioned on meter 220 across a joint that is formed between a stationary part 221 of the frame of meter 220, and a movable part 222 of the door of meter 220. As shown in FIG. 3, when the door is opened, such as by an unauthorized person, part 222 will move relative to part 221, causing radio tag assembly 210 to break and cease normal functionality. Obviously, the specific arrangement of an electric meter shown on FIG. 2 is illustrative, it being understood that the arrangement of different utility meters (e.g., the housings for electrical meters) will vary with each specific utility company.

Figure 4:
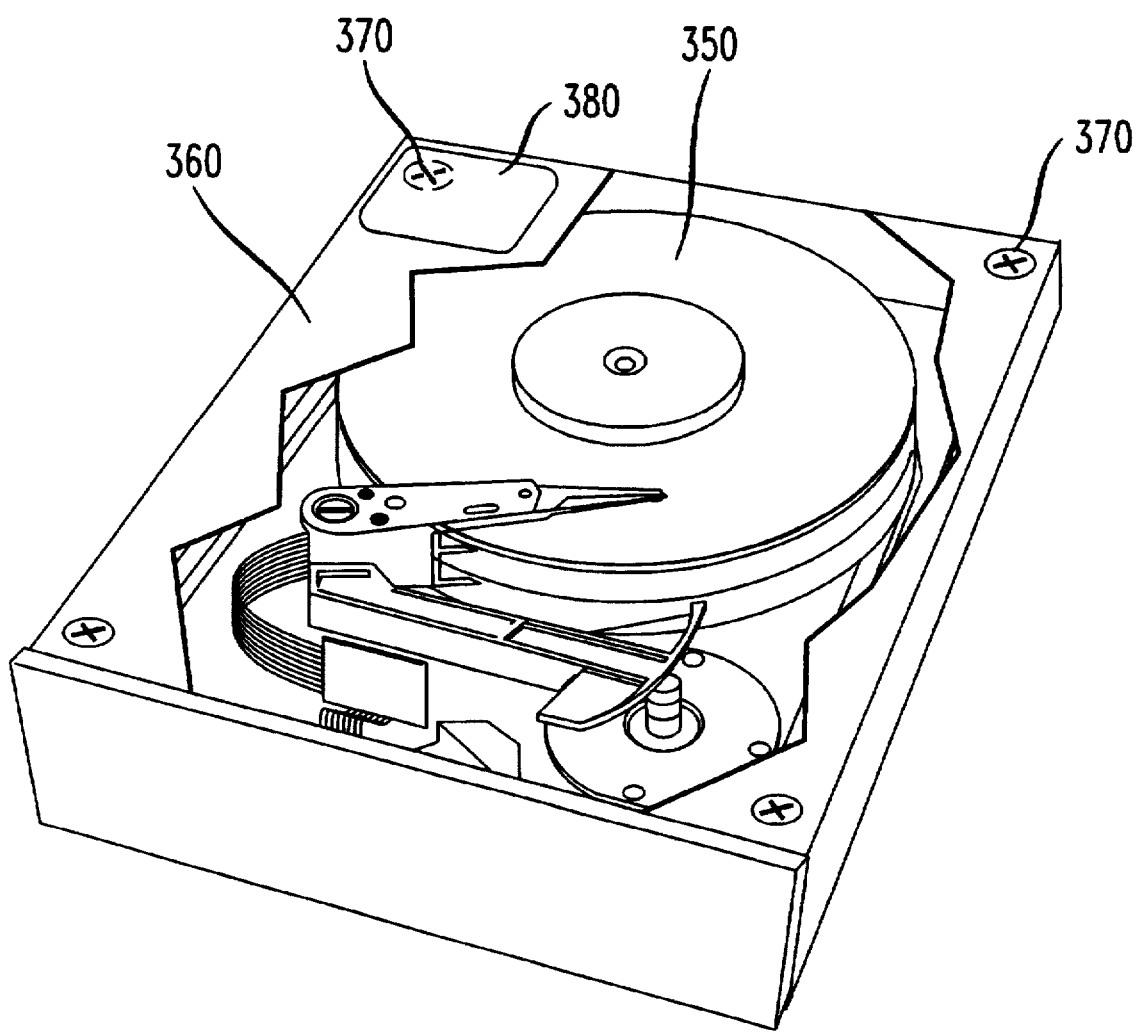
FIG. 4 is a diagram illustrating the placement of a tag of the type shown in FIG. 1 on a hard disk drive, to indicate to service personnel that the case of the drive has been opened.

FIG. 4 is a diagram illustrating the placement of a tag of the type shown in FIG. 1 on a hard disk drive, to indicate to service personnel that the case of the drive has been opened. The hard drive is designated generally at 350, and the case thereof generally at 360. In order to open the case, at least one screw 370 must be removed. In accordance with the invention, a radio tag 380 is affixed to case 360 in such a way that the tag must be removed, and therefore broken, if screw 370 is to be removed. Therefore, by determining whether or not radio tag 380 is operative, one can determine whether or not case 360 of drive 350 has been opened.

Figure 5:
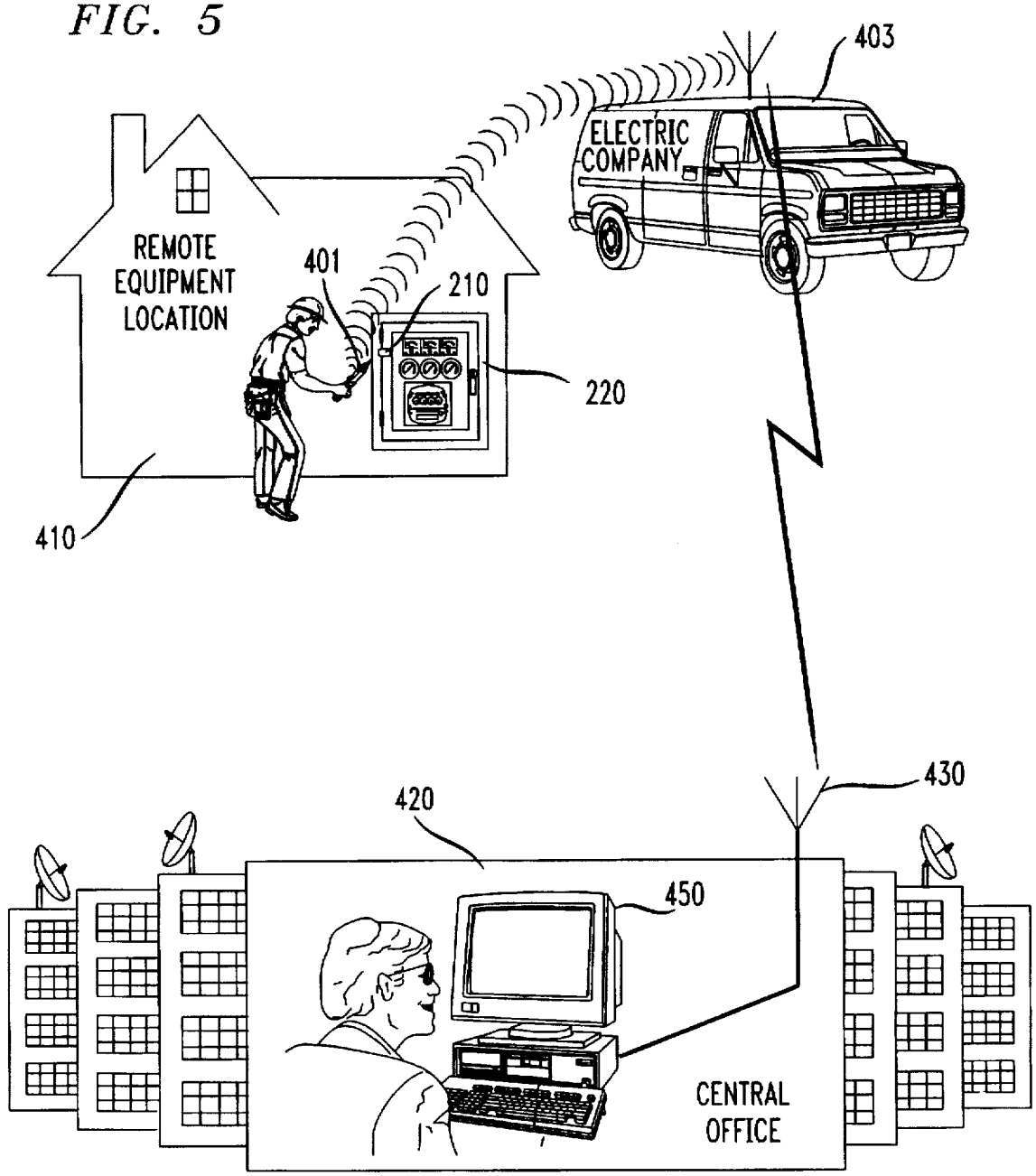
FIG. 5 is a diagram illustrating communication between the tag of FIG. 1, when placed as shown in FIGS. 2 and 3, and a remote monitoring site.

FIG. 5 is a diagram illustrating communication between the tag assembly of FIG. 1, which may be positioned as shown in FIGS. 2 and 3 on electric meter 220 at a first location 410, and a remote monitoring site 420. At site 420, a computer 450 is connected through a suitable interface to an antenna 430. In a manner well known to those familiar with radio tags, the status of a particular radio tag, such as the tag assembly positioned on meter 220, can be ascertained by directing an electrical radio-frequency signal generated in a hand held reader-transceiver (i.e., transmitter/receiver) 401 toward the radio tag, and monitoring the radio-frequency signal which is reflected back to reader-transceiver 401 by the radio tag, which, as stated previously, acts as a transponder. The signal received in reader-transceiver 401, or the lack of receipt of a signal, in the case of a radio tag that has been rendered inoperative through tampering, is appropriately sensed and interpreted in circuitry within reader-transceiver 401, in order to generate a logic signal indicating the "working properly" or "broken" status of the radio tag. Reader-transceiver 401 is then arranged, in turn to beam or otherwise transmit an output signal indicative of the radio tag status either directly toward remote monitoring site 420, or indirectly toward that site via a mobile transceiver located in a vehicle 403. In either event, when the status signal is received at remote monitoring site 420, that signal can be used to control the display of computer 450, thereby providing to a user a visual or other indication of the operative (or inoperative) status of the radio tag.

In the foregoing description, it will be recognized that the electrical energy sent to the tag from reader-transceiver 401 is in the form of a message, and that the reflected portion of the received electrical energy is also a message, both capable of being processed by various computer or other logic circuits. In order to provide enhanced security and freedom from tampering, the messages communicated between the radio tag transponder and the remote site are advantageously encrypted.

Figure 6:
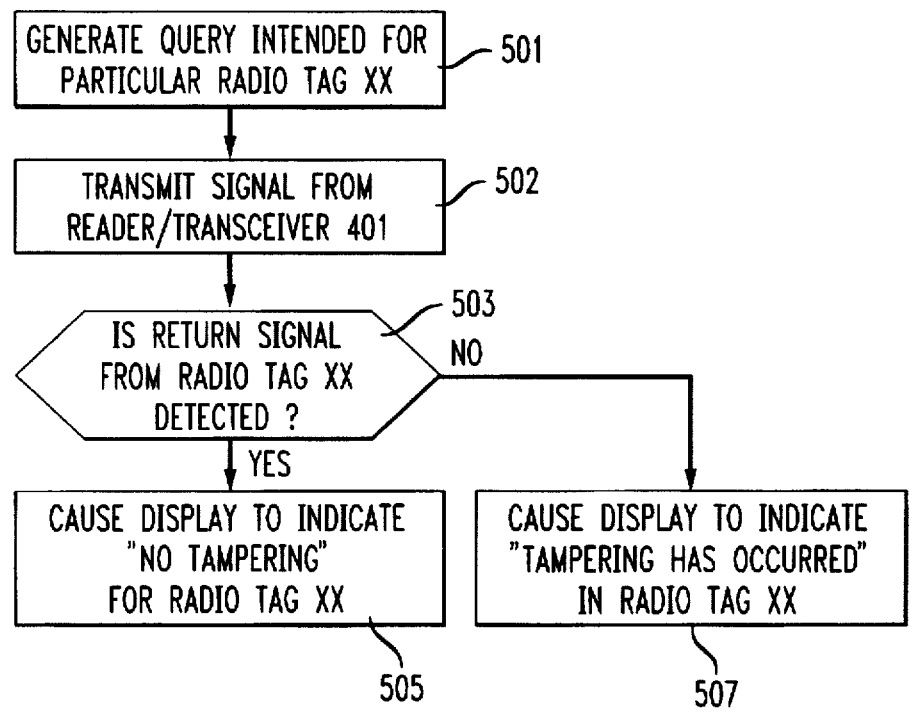
FIG. 6 is a flow diagram illustrating the process used to monitor the status of several radio tags in accordance with the present invention.

FIG. 6 is a flow diagram illustrating the process used to monitor the status of one of several radio tags in accordance with the present invention. Assuming that a radio tag of the type shown in FIG. 1 is affixed to a meter housing of the type shown in FIGS. 2 and 3, when it is desired to monitor the status of the meter, to determine if tampering has occurred, a signal is generated in step 501 and transmitted in step 502 from reader-transceiver 401 towards the radio tag assembly. This signal may be received in several radio tags, not just the one that is of interest in the present illustrative example. However, the signal transmitted in step 502 may include encoded information indicative of the particular tag being queried. (Alternatively, the signal transmitted in step 502 may be intended for several tags, each of which responds individually.) In step 503, the presence of a return signal from the particular radio tag of interest in the present illustrative example is monitored. A signal from this particular tag can be determined from the coded identification information contained within the memory of the radio tag itself. If a signal is detected in step 503, a first display is actuated in step 505, indicating that no tampering has occurred. On the other hand, if a signal is not detected in step 503, a second display is actuated in step 507, indicating that tampering has occurred. The first display can be a first message on the display screen of computer 450, or a green light, while the second display can be a second message on the display screen of computer 450, or a red light or any other type of easily discernible alarm signal.

Figure 7:
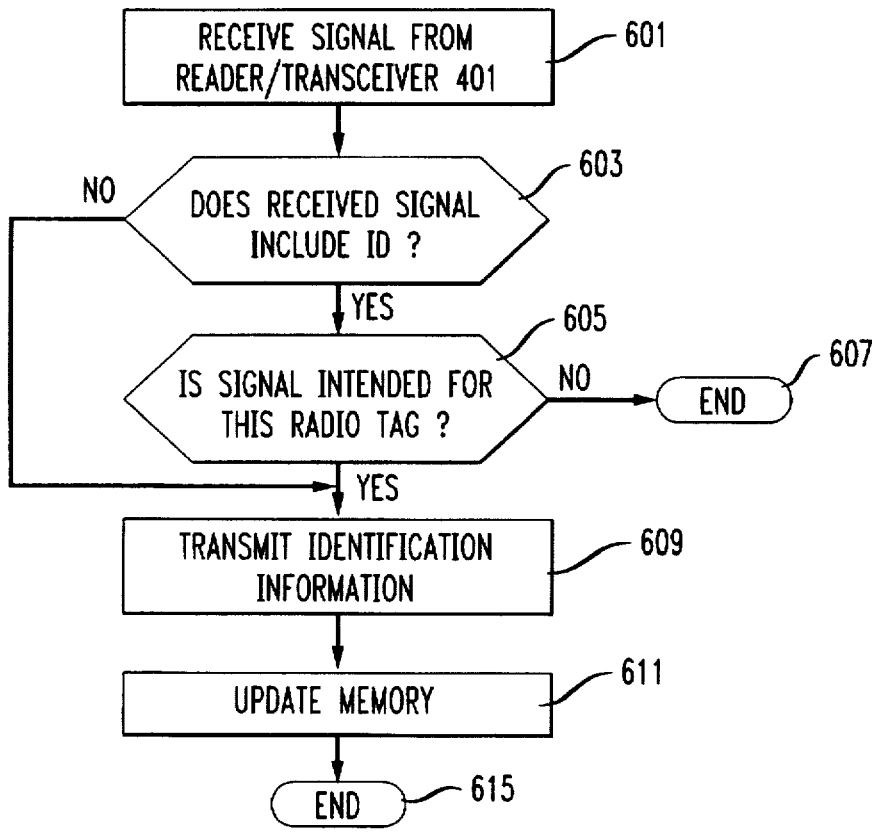
FIG. 7 is a flow diagram illustrating the process occurring in the radio tag circuitry when a radio signal is received.

FIG. 7 is a flow diagram illustrating the process occurring in the radio tag circuitry when a radio signal is received. In step 601, a radio signal transmitted by reader-transceiver 401 is received in the radio tag. A determination is made in step 603 at to whether the signal includes coded information identifying a particular radio tag. If a positive result is obtained in step 603, a determination is made in step 605 as to whether the query is intended for this particular radio tag. If not, the process ends in step 607. If a negative result occurs in step 603, or if a positive result occurs in step 605, the process proceeds to step 609, in which the radio tag "transmits" identification information which may be used at a remote location to indicate that the tag is working properly and that the object to which it is affixed has not been tampered with. As used herein, the transmitting step 609 actually consists of the radio tag reflecting back reader-transceiver 401 a portion of the energy that was received from the antenna. If tampering has occurred, the radio tag will be incapable of performing step 609. In optional step 611, the memory in the radio tag is updated, so that the time of the last query may be stored in the memory within the tag. (Information previously stored in the memory may be transmitted back to reader-transceiver 401 in step 609.) Finally, the process is completed in step 615.

From the foregoing description, it will be seen that the present invention has numerous applications. For example, the present invention can be used in connection with monitoring electrical and other meters to be sure they have not been tampered with. The tags are placed on the meter and affixed in such a manner that the tag is broken and rendered inoperative if the meter is opened in an attempt to disable or turn the meter back. When a meter reader desires to read the meter, he or she can, at the same time, query the tag to determine that it is operative. This can be done using a hand held reader, which communicates with the tag, or remotely from a distant transmitter/receiver. An arrangement of this type would replace the conventional lead closures that must be physically inspected to see if they have been broken as a result of tampering.

The present invention can also be used in connection with not only monitoring the open/closed status of doors and windows by security guards, but also the integrity of boxes, containers, shipping cartons, etc.

Various modifications and adaptations of the present invention will be apparent to persons skilled in the art. Accordingly, the present invention is to be limited only by the appended claims.

What is claimed is:

1. A tamperproof security device for remotely monitoring the security status of an article, said device including:
a passive two way communication circuit for receiving a remotely generated request for status information and, responsive to said request, for transmitting said status information to a remote location; and
breakable substrate means for supporting said passive circuit and for support positioning the security device on said article so that said substrate is broken and said circuit is desabled when said article has been subject to tampering.

2. The invention defined in claim 1 wherein at least one critical component of said circuit is affixed to the breakable substrate.

3. The invention defined in claim 1 wherein at least a portion of said two way communication is encrypted.

4. The invention defined in claim 1 wherein said security device includes a memory.

5. The invention defined in claim 4 wherein said memory is arranged to store information indicating the date on which the circuit was last successfully operated.

6. The invention defined in claim 4 wherein said memory is arranged to store information relating to said remote location.

7. A method of monitoring an object to detect the occurrence of tampering with said object, the method including the steps of:
affixing a radio tag to said object; and
arranging said radio tag to respond to remotely generated status inquiry signals only if said object has not been tampered with.

8. The method of claim 7 wherein said arranging step includes disabling the ability of said radio tag to respond only if said object has been tampered with.

9. A method of monitoring an article to detect the occurrence of tampering with said article, the method including the steps of:
arranging a radio tag so that the functionality of said radio tag is impaired if at least one component in said radio tag is broken; and
affixing said radio tag to said article, so that said component is broken when said article is tampered with.

10. A tamperproof security device for monitoring the security status of an article, said device including a multilayer structure including:
a first layer including a printable surface;
a second layer adjacent to said first layer and including a passive two way communication circuit for receiving a remotely generated request for status information and, responsive to said request, for transmitting said status information to a remote device; and
a third layer adjacent to said second layer and including a breakable backing.

11. A system for remotely monitoring the security status of an object, said system comprising:
a radio tag assembly;
means arranged to send messages to said radio tag assembly and, to receive responses from said radio tag assembly; and
means for affixing said radio tag assembly to said object so that said radio tag assembly does not respond to said messages when said object has been tampered with.

12. A method for remotely monitoring the security status of an object, said method comprising the steps of:
affixing a passive transponder to said object;
sending messages from a remote site to said transponder;
receiving messages from said transponder in said remote site when said transponder is operational; and
disabling said transponder from responding to messages from said remote site when said object has been tampered with.

13. A method of remotely monitoring the security status of an article, including the steps of:
receiving in a passive two way communication circuit, a remotely generated request for status information;
responsive to said request, transmitting said status information to a remote location; and
positioning the security device on said article so that said circuit is disabled when said article has been subject to tampering.

* * * * *